(12) United States Patent
Kraft

(10) Patent No.: US 9,164,742 B2
(45) Date of Patent: Oct. 20, 2015

(54) METHOD AND A SYSTEM FOR SEARCHING FOR PARTS OF A COMPUTER PROGRAM WHICH AFFECTS A GIVEN SYMBOL

(76) Inventor: Johan Kraft, Västerås (SE)

(*) Notice: Subject to any disclaimer, the term of this patent is extended or adjusted under 35 U.S.C. 154(b) by 548 days.

(21) Appl. No.: 13/579,454

(22) PCT Filed: Jan. 25, 2011

(86) PCT No.: PCT/EP2011/050935
§ 371 (c)(1),
(2), (4) Date: Oct. 5, 2012

(87) PCT Pub. No.: WO2011/101206
PCT Pub. Date: Aug. 25, 2011

(65) Prior Publication Data
US 2013/0212563 A1  Aug. 15, 2013

Related U.S. Application Data

(60) Provisional application No. 61/305,815, filed on Feb. 18, 2010.

(51) Int. Cl.
*G06F 9/44* (2006.01)
*G06F 9/45* (2006.01)
*G06F 11/36* (2006.01)

(52) U.S. Cl.
CPC ........ *G06F 8/433* (2013.01); *G06F 8/43* (2013.01); *G06F 8/73* (2013.01); *G06F 8/75* (2013.01); *G06F 11/3604* (2013.01)

(58) Field of Classification Search
None
See application file for complete search history.

(56) References Cited

U.S. PATENT DOCUMENTS

| 5,161,216 | A | * | 11/1992 | Reps et al. | 717/151 |
| 2002/0052856 | A1 | * | 5/2002 | Satoh | 706/4 |
| 2009/0249307 | A1 | * | 10/2009 | Yoshida | 717/131 |
| 2011/0041123 | A1 | * | 2/2011 | Abadi et al. | 717/155 |

FOREIGN PATENT DOCUMENTS

EP  714064  5/1996

OTHER PUBLICATIONS

Weiser, M, "Program Slicing," Proceeding ICSE '81; Proceedings of the 5th International Conference on Software Engineering, [Online] 1981, pp. 439-449.

* cited by examiner

*Primary Examiner* — Lewis A Bullock, Jr.
*Assistant Examiner* — Mark Gooray
(74) *Attorney, Agent, or Firm* — Dilworth & Barrese, LLP.

(57) ABSTRACT

The present invention relates to a method and system for searching for parts of a computer program which affects a given symbol. The system comprises a first data storage area (1) for storing a symbol database including information on names of symbols, such as variables and functions, used in the computer program, and including, in connection to each symbol, a reference list including references to locations in the computer program where the symbol is used, a second data storage area (2) for storing a result list, and a search module (6) configured to in response to a request for information on which parts of the computer program affect a given symbol: a) retrieve the list of references for the symbol from the database, and store at least some of the references in the result list, b) analyze the program code or a representation of the program code on the location pointed out by the stored references, and based thereon determine whether the value of the symbol depends on any other symbol or symbols, and if the analysis discovers that the value of the symbol depends on any other symbol or symbols the steps a-b are repeated in a recursive manner for the discovered symbol or symbols until the analysis reveals that the value of the symbol does not depend on any further symbol, and to produce information on which parts of the computer program affects the symbol based on the references stored in the result list.

15 Claims, 5 Drawing Sheets

METHOD AND A SYSTEM FOR SEARCHING FOR PARTS OF A COMPUTER PROGRAM WHICH AFFECTS A GIVEN SYMBOL

FIELD OF THE INVENTION

The present invention relates to the field of computer systems and programming, in particular to methods and systems for analyzing program structures, and more particular to methods and systems for searching for parts of a computer program which affects a given symbol, so called backward slicing.

All references to "computer program" or "program code" implies "program source code", unless otherwise stated.

PRIOR ART

Software is found almost everywhere today, not only in the things most people normally think of as computers. Cars, trains, trucks, telecom switches, and industrial robots are examples of products relying on software systems running on embedded computers. The software systems may consist of many thousands or even millions of lines of program code developed by many engineers, often over several years. The cost for software development is today a substantial part of overall product development costs. It is commonly known that software development often takes much longer time than anticipated and software defects "bugs" often elude detection, despite large amounts of testing, and therefore end up in the final products. According to a study from by the National Institute of Standards and Technology, software defects cost the U.S. economy up to $59.5 billion annually.

Software development can be improved by better tools for program comprehension, i.e., software tools which analyze and visualize program code in order to facilitate the developer's understanding and overview of the program code.

The program code of a computer program includes a plurality of program statements. A program statement is a phrase in a high-level programming language, e.g., an assignment of a variable, a function call or a condition. During development and troubleshooting, it is very valuable to find the dependencies between a particular program statement currently in focus and other parts of the program. There are two main kinds of dependencies between statements of a program: control-flow dependencies, which specify the possible execution order between statements, and data-flow dependencies, which specify where symbols, e.g., variables, are read and written. Tools for finding dependencies between different parts of a program have been developed both in academia and as commercial products, at least since the 1990s. A plurality of those tools provides control flow analysis, such as generating control-flow graphs and function call graphs, and some of them also provide data-flow analysis. Program slicing is an established type of data-flow analysis which implies finding all program statements of a computer program that are relevant for the value of a particular symbol, e.g., a variable, parameter or function return value. Several types of program slicing have been proposed, but the most well-known is backwards slicing, which means to find all parts of a computer program which affects a particular symbol, i.e., directly as well as indirectly. Program slicing is typically based on static analysis, i.e., analysis of source code or object code, although dynamic slicing methods, using runtime measurements, also have been proposed. The present invention relates to static backwards slicing.

U.S. Pat. No. 5,161,216 discloses an example of a method for providing program slicing of a computer program having multiple procedures. In a first step, the program is analyzed by generating a system dependence graph which describes the dependencies between program statements. The system dependence graph is a complete map over the dependences of program code in the computer program and consists of program dependence graphs, each representing a single procedure, and additional edges that represent procedure calls, i.e., direct dependencies between a call site and a called procedure. A slice of a program with respect a variable X consists of all statements of the program that might affect the value of X. Upon receiving a request from a user, the system dependence graph is used in an algorithm to carry out interprocedural slicing that identifies the components of the system dependence graph that might affect the values of the variables defined at or used at a given program point.

A disadvantage with the method in U.S. Pat. No. 5,161,216 (and similar approaches) is that it takes a long time to build up the system dependence graph. This is a very detailed model of the program, which needs to be constructed for the whole source code. The larger program, the longer is the time to build the system dependence graph. The time required for constructing a program dependence graph is in worst case proportional to the cube of the program size. Moreover, the method requires a large amount of memory for storing the system dependence graph. In a worst case the memory needed is quadratic to the program size. According to the research group behind this method, this method is not suitable for programs including more than 200.000 lines of program code. According to own experiments using the tool CodeSurfer, which is the commercial spin-off of this research group, analysing 183.000 lines of program code using this method could not be completed in realistic time After 92 hours the analysis was cancelled and the log showed that most of the analysis still remained. This test case was still only about 7% of the full source code of the system analyzed.

The larger computer program, the larger is the need of program comprehension tools, and today it is common to have computer programs of more than one million lines of code. For example, a specific control system for industrial robots consists of 2-3 million lines of code, telecommunication switches often include several different computer boards, each running between 1-5 million lines of program code, cars may include up to 100 million lines of code distributed on 70-100 cooperating computers, and the Linux kernel includes more than 12 million lines of code. Accordingly there is a need for a program slicing method capable of analyzing very large programs, with runtimes and memory requirements acceptable for practical use.

OBJECTS AND SUMMARY OF THE INVENTION

The object of the present invention is to provide an improved method for searching for parts of a computer program which affects the value of a given symbol, i.e. an improved method for providing backward slicing, which method can handle large programs with significantly more than 200 000 lines of code, with runtimes and memory requirements acceptable for practical use.

According to one aspect of the invention this object is achieved by a method comprising:
a) generating a symbol database including information on names of symbols, such as variables and functions, used in the computer program, and including, in connection to each symbol, a reference list including references to locations in the computer program where the symbol is used, b) receiving a request for information on which parts of a computer program that affects a given symbol, and in response to the request, c) retrieving the list of references for the symbol from said symbol database, and storing at least some of the references in a result list, d) analyzing, for each reference on the list, the program code or a representation of the program code of the computer program on the location pointed out by the reference, and based thereon determining whether the value of the symbol depends on any other symbol or symbols, e) if the analysis discovers that the value of the symbol depends on any other symbol or symbols the steps c-d are repeated in a recursive manner for the discovered symbol or symbols until the analysis reveals that the value of the symbol does not depend on any further symbol, and f) producing information on which parts of the computer program the symbol is dependent on based on the references stored in the result list.

The symbols are, for example, parameters, variables, arrays, pointers, constants and function return values. The first step in the method according to the present invention is to create a symbol database including a reference list including references to locations of program statements in the computer program where the symbols are used. The generation of the symbol database includes identifying all symbols in the computer program and for each symbol identifying in which program statements the symbol is used, and creating a list of references to the locations of the identified program statements. The symbol database can be regarded as an index or map over the program code. Since no advanced models of the code are constructed, this is a very fast analysis, which is done in matter of minutes also for programs with millions of lines of code. In experiments, a symbol database for 1,083,604 lines of industrial program code was generated in 118 seconds, by using a third party tool. This step is significantly less time-consuming than creating a system dependency graph for the program. The time required for generating a symbol database is almost linear to the program size, for program sizes up to a few million lines of code, based on measurements. In comparison, the generation of system dependence graphs has a cubic worst-case time complexity.

According to the invention, the detailed and accordingly more time consuming analysis of the program regarding the dependences for the symbol is carried out in the second step of the method. Since the analysis is limited to the parts of the program that contains the symbol, this analysis is quickly carried out. The runtime of this analysis is in practice linearly proportional to the program size in both steps. Generating a symbol database is in practice linearly proportional to the whole program size, at least up to a few million lines of code, and the runtime of the search is in practice linear to the slice size, i.e., the amount of code found relevant. Note that the most relevant measure of code size in this case is the number of symbol references. Thus, the method according to the invention is fast and can be applied on large software systems, since the runtime of the detailed analysis is mainly dependent on the number of relevant statements found, i.e. on size of the slice, not on the total size of the program.

The memory usage of the method according to the invention depends on the size of the symbol database, which is typically linearly proportional to the program size. This means that the memory usage is typically linear to the program size.

The value of a symbol is not necessarily dependent on all statements where it is used. This means that not all of the references in the list are relevant to the symbol. Preferably, only the references found relevant is stored in the result list, and only the relevant references are analyzed. Whether or not a symbol reference is relevant depends on the type of symbol, for example, if the symbol is a parameter, a variable or a function, and in what context the symbol is referenced in the statement, e.g., if the symbol might be assigned or modified by the statement, or if the address of the symbol is obtained in the statement. According to an embodiment of the invention, the retrieved list of references is filtered before it is stored in the result database. The filtering step includes determining for each reference in the list whether or not the reference is relevant based on the type of symbol and the type of reference. The references found not relevant are discarded from the current analysis, while the references found to be relevant are stored in the result list and analyzed further according to step d. This embodiment of the invention separates relevant statements from irrelevant statements, with respect to the current user query, and thereby implements the search logic, and speeds up the search.

According to an embodiment of the invention, the generation of the symbol database further includes determining the type of symbol, storing the type of symbol in the symbol database, determining the type of reference based on in which context the symbol is used, and storing the type of reference in the symbol database. Thus, the symbol database includes, for each symbol in the program code, information on the type of the symbol, and the list of references includes, for each symbol reference, information on the type of the reference. Although it is possible to store this information somewhere else, it is practical to store it in the symbol database. That makes it easy to find the information.

According to an embodiment of the invention, the method comprises storing the analyzed symbols in a table, and checking if the symbol is in the table before retrieving the list of references from said database, and if the symbol is in the table the symbol has already been analyzed and is therefore not analyzed again. The table can be implemented using, for example, a Hash table. Since a particular symbol may be used at many locations in the source code, even in the same statement, it is crucial for the efficiency of the search to avoid repeating already performed analysis. This embodiment of the invention prevents the same symbol from being analyzed several times and accordingly speeds up the search significantly.

According to an embodiment of the invention, the symbol database includes a tokenized representation of the program code, and step d includes analyzing, for the relevant references on the list, the tokenized representation of the part of the program code pointed out by the reference. A tokenized representation of the program code is a higher level representation where the characters of the program code text have been converted into lexemes (also known as tokens), according to the grammar of the programming language at hand. A lexeme has attributes, such as type, e.g., identifier or operator, line number and column number, and lexemes of identifier type has a reference to the referenced symbol through a symbol reference entity. The tokenized representation of the program code can be produced at the same time as the symbol database is generated. However, the tokenized representation of the program code can be produced at an earlier or later stage. For example, given a particular reference, the symbol database can be asked to produce the corresponding tokenized representation, i.e., the corresponding lexeme. Lexemes have connections to the preceding and following lexeme, to allow for traversing the lexeme stream, i.e., the tokenized representation, backwards and forwards.

Although it is possible to analyze the real program code, it is easier and faster to analyze a tokenized representation of the program code stored in the database. This embodiment further speeds up the search.

The request for information on which parts of a computer program that affects a given symbol can be received from a user, or from another computer program. According to an embodiment of the invention, the user marks a symbol at a location in the computer program and the method comprises generating a request for information on dependences on the marked symbol. This embodiment makes it easy for a user to quickly get information on which parts of the program that affect symbols used in the program statement at hand.

According to a further aspect of the invention, the object is achieved by a computer program product directly loadable into the internal memory of a computer or a processor, comprising software code portions for performing the steps of the method according to the appended set of method claims, when the program is run on a computer. The computer program is provided either on a computer-readable medium or through a network.

According to another aspect of the invention, the object is achieved by a computer readable medium having a program recorded thereon, when the program is to make a computer perform the steps of the method, and the program is run on the computer.

According to another aspect of the invention this object is achieved by a system according to the description herein.

According to another aspect of the invention this object is achieved by a system according to claim 12.

Such a system comprises:
  a first data storage area for storing a symbol database including information on names of symbols, such as variables and functions, used in the computer program, and including, in connection to each symbol, a reference list including references to locations in the computer program where the symbol is used,
  a second data storage area for storing a result list, and
  a search module configured to in response to a request for information on which parts of a computer program that affects a given symbol,
a) retrieve the list of references for the symbol from said database, and to store at least some of the references in the result list,
b) to analyze, for the references in the list, the program code or a representation of the program code of the computer program on the location pointed out by the reference, and based thereon determine whether the value of the symbol depends on any other symbol or symbols, and if the analysis discovers that the value of the symbol depends on any other symbol or symbols the steps a-b are repeated in a recursive manner for the discovered symbol or symbols until the analysis reveals that the value of the symbol does not depend on any further symbol, and to produce information on which parts of the computer program the symbol is dependent on based on the references stored in the result list.

The first and second data storage area can be contained in the same physical entity or in different physical entities.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

A computer program includes a plurality of program statements. A program statement is a phrase in a high-level programming language such as C. Sometimes it necessary to amend the program code of the computer program, for example, during development of the program and during fault tracing of the program. However, before amending the program code it is essential to find out if there exist any dependencies between the part of the program to be amended and the rest of the program. If the code is amended at one part in the program, it might be necessary to amend the code at all the other parts of the program which is related to the amended part.

Figure 1:
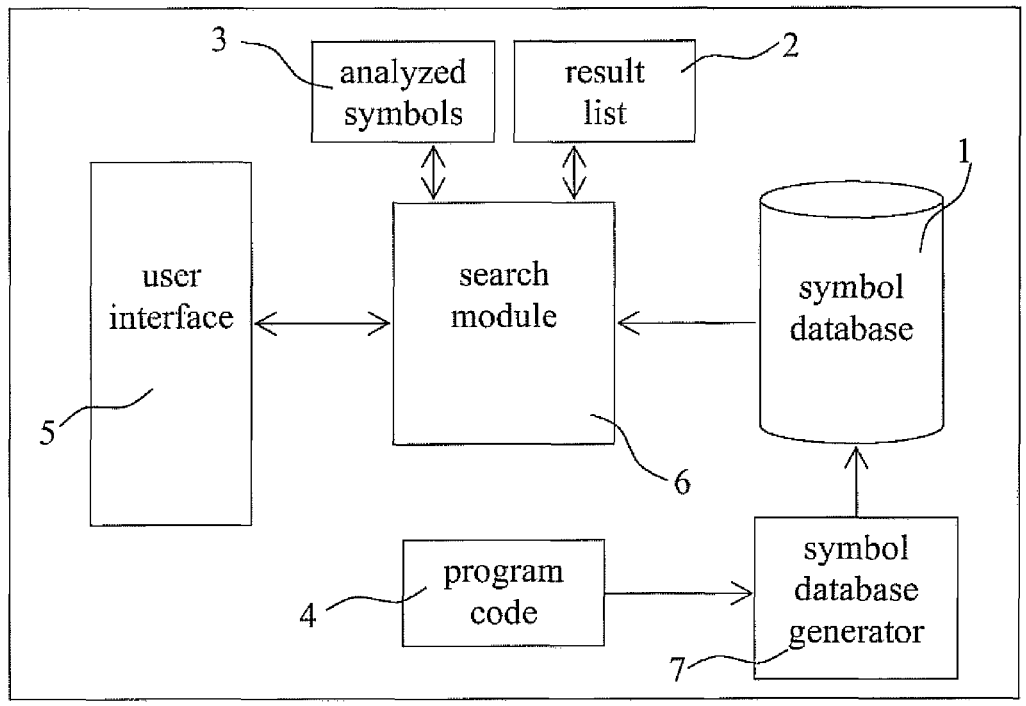
FIG. 1 shows an example of a system for searching for parts of a computer program which affects a given symbol according to the invention.

FIG. 1 shows an example of a system for searching for parts of a computer program which affects the value of a given symbol according to the invention. The symbol can, for example, represent a variable, a parameter, or a function. The system comprises first data storage area 1 for storing a symbol database, second data storage area 2 for storing a result list, third data storage area 3 for storing analyzed symbols, and fourth data storage 4 for storing the program code to be analyzed. The third data storage area 3 for storing analyzed symbols is optional. The system further comprises a user interface 5 configured to receive a request for information on which parts of a computer program affect the value of a given symbol, and to display information on which parts of a computer program affect the value of symbol. The user interface includes, for example, a display unit.

The system further comprises a search module 6 configured to search for locations, in the form of statements, of the computer program which affects the value of the given symbol by using the symbol database and to produce information on which locations, e.g. statements, of the computer program affects the value of the symbol. In order to avoid analyzing the same symbol multiple times, the analyzed symbols can be stored in the third data storage area 3 in a suitable data structure, e.g. a hash table. The table is checked before starting each search operation. If an identical analysis of the symbol has already been performed, the search operation is aborted.

The system also comprises a symbol database generator 7 configured to generate the symbol database based on the program code stored in the third data storage area 3. The system comprises a processing unit (not shown) for executing the search module 6 and the database generator 7. The parts of the system can be implemented on one or several computers. For example, the symbol database can be generated on one computer and stored on another computer.

The symbol database can be regarded as an index over the source code and can be generated using a lexical scan, possibly after applying a preprocessor. The symbol database can be generated using known tools such as "Understand for C++" from Scientific Toolworks, Inc. "Imagix 4D" from Imagix Corporation, "CodeSurfer" from Grammatech, Inc, or "Rigi" which is an Open Source. U.S. Pat. No. 4,931,928 discloses a method for analyzing source code, and describes a method for generating a symbol database. The symbol database does not have to be a full database in the traditional sense, e.g., with SQL support; a special-purpose data structure with adequate lookup functionality is sufficient.

Figure 2:
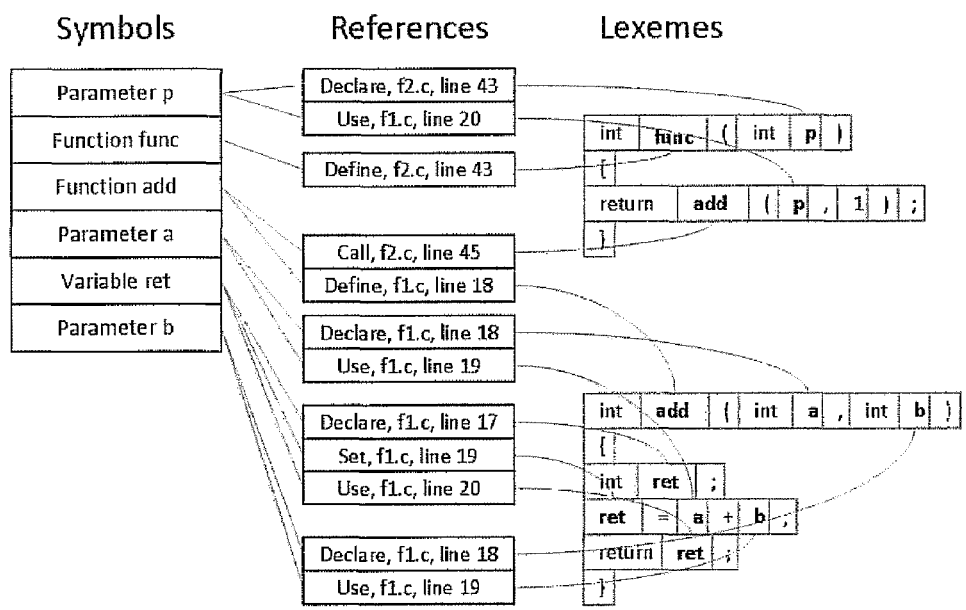
FIG. 2 shows an example of a symbol database.

FIG. 2 shows an example of a symbol database. The symbol database contains three types of entities: symbols, references and lexemes. A symbol, for example, corresponds to a parameter, a variable, an array, a pointer, a constant, a function return values, or a user-defined datatype. The symbol database contains information on name and type for all symbols contained in the program code. The symbol type is e.g. variable, parameter or function. The symbol entry contains information on the name and type of the symbol.

A reference is an entry which connects a symbol with the code locations where the symbol is used. A reference includes a location, such as filename, line number and possibly column number, to the location in the computer program where the symbol is used. References have types, indicating the context in which the symbol is used, e.g., if the symbol is declared, used, defined, set (assigned) or called.

The symbol database contains a tokenized representation of the program code, typically one stream of lexemes (also denoted tokens) per included code file. The lexemes represent the analyzed source code in a tokenized manner according to the syntax and grammar of the programming language, in this case C. A lexeme contains the corresponding source code text, and references to the previous and following lexeme. Lexemes are classified in types, such as keywords, operators, delimiters, identifiers and literals. The method includes producing a tokenized representation including a stream of lexemes of the program code of the computer program, and storing the lexemes in the symbol database.

The different types of entities are connected by bidirectional links, which connects symbols with references and references with lexemes where the latter provides the location of the word in the program code referencing the symbol. As shown in FIG. 2, each symbol may have links to multiple references denoted a reference list, but a reference always has a link to only one symbol and a link to only one lexeme. A reference list includes references to all locations in the computer program where the symbol is used directly. This includes uses in preprocessor macros, since the analyzed code is assumed to have been preprocessed before or during the generation of the symbol database.

The symbol database makes it easy to look up a specific symbol and find all locations (as lexemes) where the symbol is used in a particular way, e.g. assigned. Each location (statement) can then be analyzed on the lexeme level in order to identify other symbols of relevance, on which the first symbol depends. These new symbols are thereafter analyzed recursively. This continues until all relevant symbols have been analyzed.

The invention supports analysis of aggregated symbol expressions like "car.speed", and array expressions like "car[i].speed", which are common in C and most other programming languages. In an expression involving several symbols, the first symbol (car) sets the context of the following symbol (speed) and is therefore in the following referred to as a "primary" symbol. In a function call expression with arguments, like "foo(a, b);", the function name (foo) is the primary symbol of the expression. In an array expression, the index expression (i.e., inside the brackets "[ ]"), is treated as an independent expression with own primary symbols.

The first step of the method according to the invention is to generate and store the symbol database. The first step does not have to be repeated again until the program code has been amended. The second step is the actual program slicing and is carried out upon receiving a request regarding which parts of a computer program that affect a given symbol and includes searching for each location in the program code that affects the value of the symbol.

Figure 3:
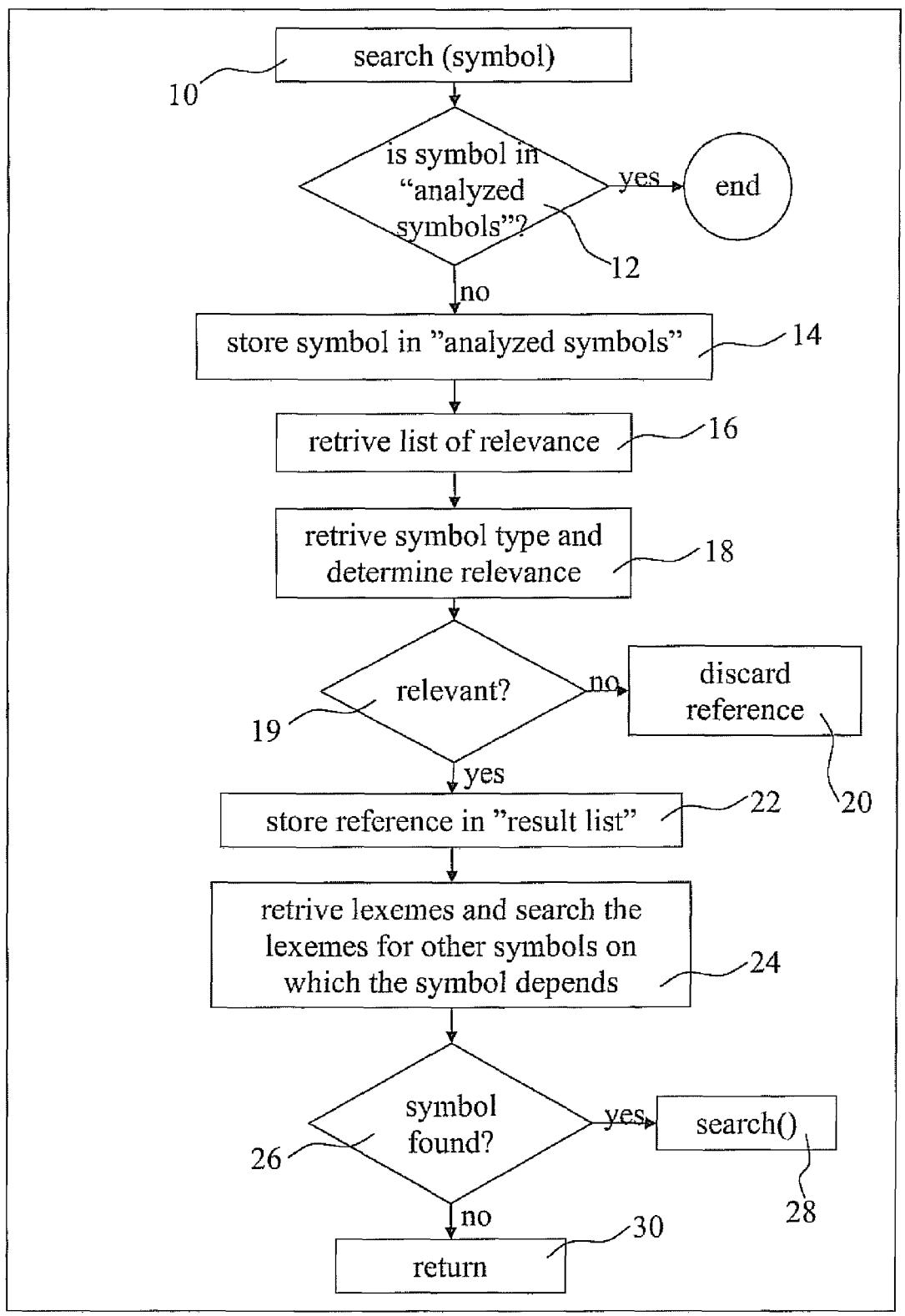
FIG. 3 shows a flow chart of a method for searching for parts of a computer program which affects a given symbol according to an embodiment of the invention.
Figure 4:
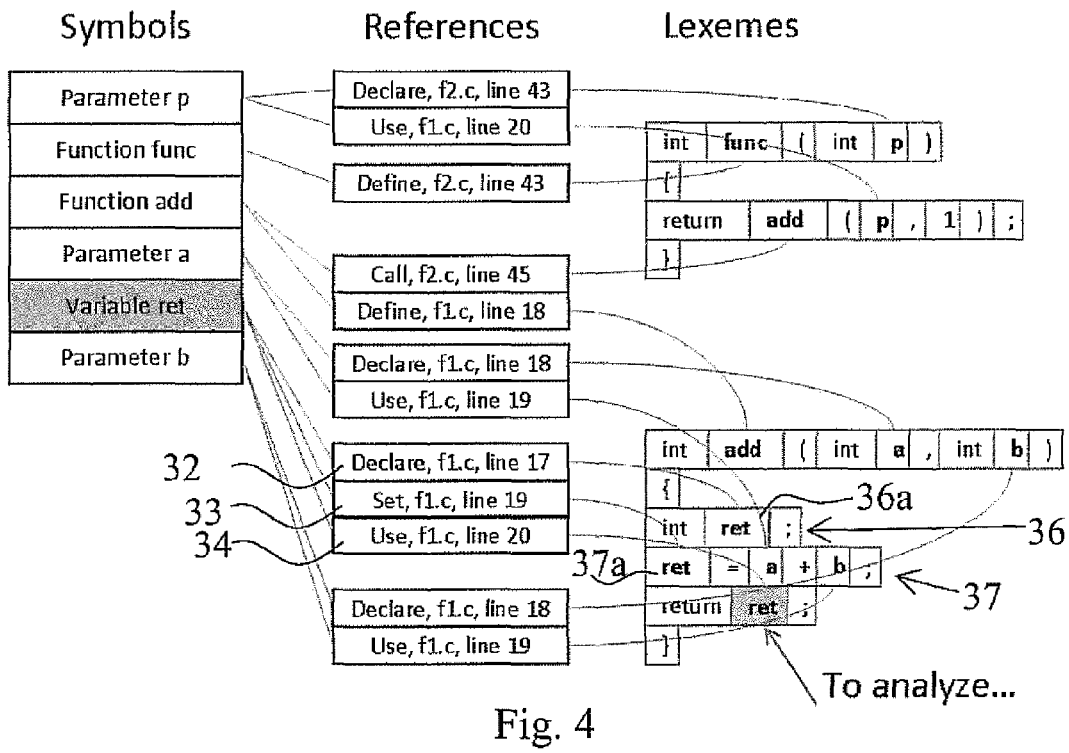
FIGS. 4-9 show an example of an analysis of a given symbol with the method according to the invention.
Figure 5:
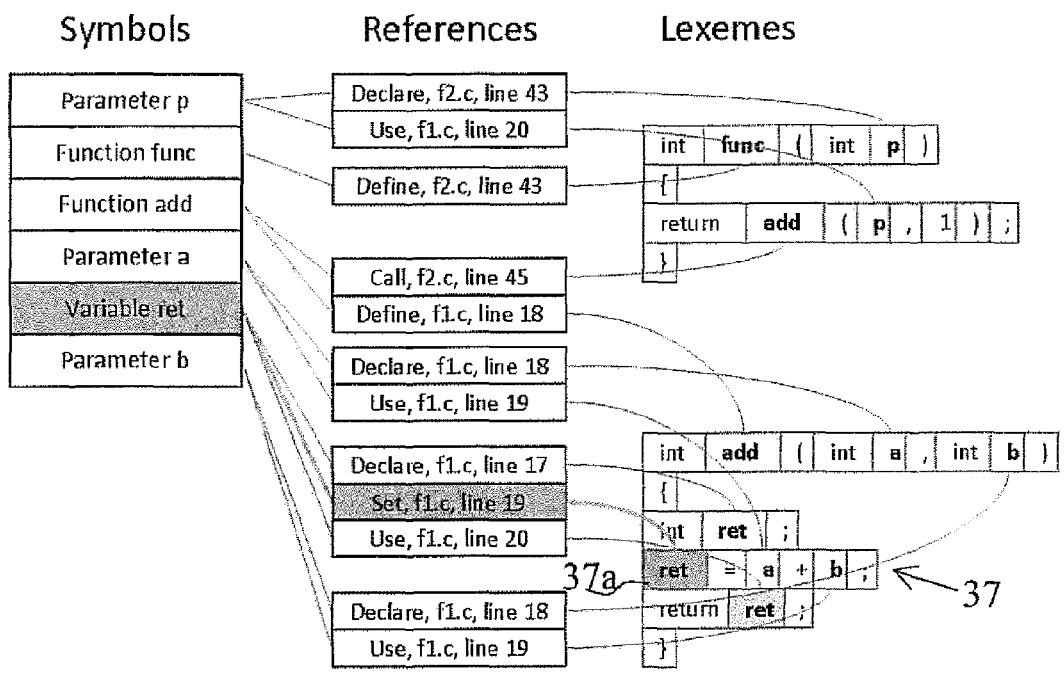
Figure 6:
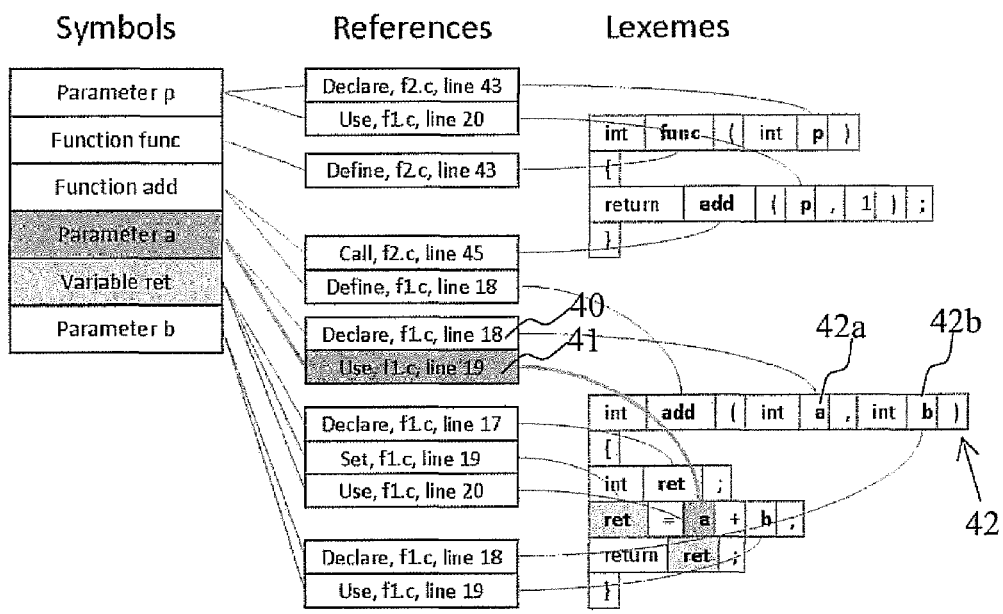
Figure 7:
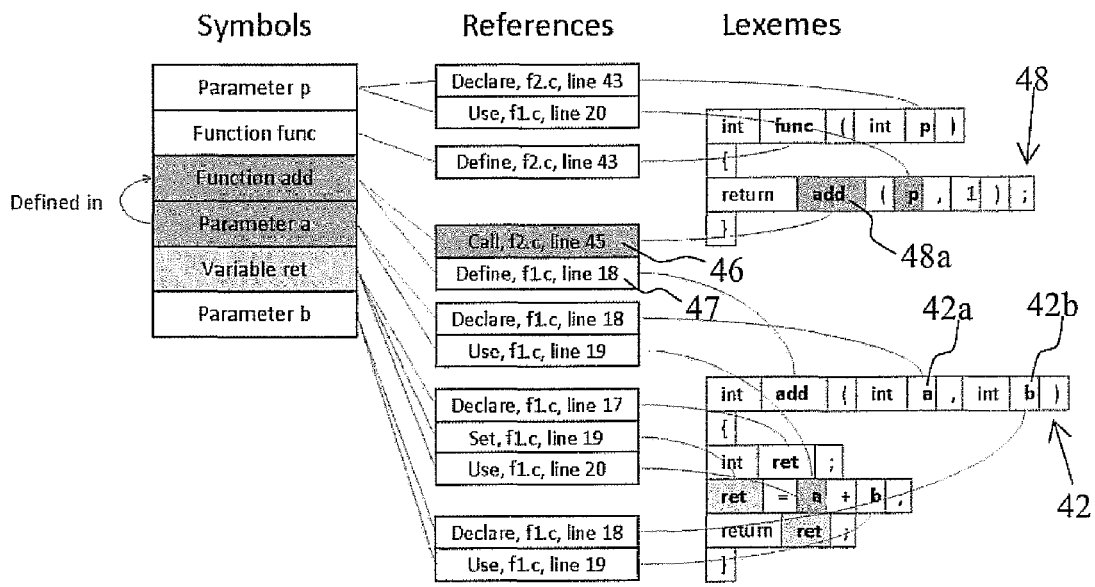

FIG. 3 shows a flow chart of an example of the second method step. It will be understood that each block of the flow chart can be implemented by computer program instructions.

In the second step, a search algorithm is executed. A call to the search algorithm includes the name of the symbol to be analyzed, block 10, and possibly additional information about the queried symbol to further refine the search. The search algorithm is repeated recursively until all statements and symbols which affect the value of the initial symbol are found.

The table "Analyzed symbols" is always empty upon receiving the user query, but is persistent between recursive searches of the same user query. Each time the search algorithm is recursively repeated, the table "Analyzed symbols" 3 is checked, block 12. If the symbol has already been analyzed, the search operation is aborted, otherwise the symbol is stored in the table "Analyzed symbols", block 14, to avoid that it will be analyzed again. This function is optional. However, the speed of the search is essentially increased if it is used.

The list of references, including the references to the program code and the reference types, for the symbol is retrieved from the symbol database, block 16. In the next step the retrieved list of references is filtered by determining for each reference in the list whether or not the reference is relevant for the symbol or not. The filtering is made based on the symbol type and reference type. Thus, for filtering purpose, the symbol type for the symbol is retrieved from the symbol database, block 18. For each of the retrieved references it is determined whether the reference is relevant or not based on the type of symbol and type of reference, block 19. If the reference is found to be irrelevant for the symbol, the reference is discarded, block 20. No further analysis is carried out on the discarded reference. If the reference is found to be relevant for the symbol, the reference is stored in the result list, block 22. The filtering steps are repeated for all references in the retrieved list. After filtering only the relevant references are stored in the result list. This filtering step separates relevant statements from irrelevant statements which implements the search logic, i.e., backwards slicing.

In the following is described how it can be determined whether a reference is relevant or not for a given symbol. The table 1 below shows three symbol types (Variable, Parameter, and Function) and several reference types (Set, Modify, Init, Use, Use Adress, Return, Define, Declare, Call) and which combinations are relevant, not relevant and not possible (–).

TABLE 1

| Reference type: | Symbol type: | | |
| --- | --- | --- | --- |
| | Variable | Parameter | Function |
| Set/Modify/Init | Relevant | Relevant | — |
| Use | Not relevant | Not relevant | — |
| Use Address | Relevant | Relevant | Relevant |
| Return | — | — | Relevant |
| Define | Relevant | Relevant | Relevant |
| Call | — | — | Relevant |
| Declare | Relevant | Relevant | Relevant |

Note that a "use" of a function return value is indeed possible, but is assumed to produce a call reference.

Case 1: Assignment
Symbol Type: Variable or Parameter, and
Reference Type: Set, Modify or Init
Example: var=X;

In this example, var is the current symbol under analysis, and the current symbol reference is an assignment where var is given the value of another variable X. Since var is a variable or parameter known to be relevant, all assignments are considered relevant (also assignments using pointer dereferencing, like *var=X;), and all primary symbols used in the assignment are thereby relevant and should thus be analyzed in a recursive call to Search. However, this is an overestimation, as the effect of an assignment might be "killed" by later assignment overwriting the variable at hand before the value reach the symbol use statement in focus. An optimization is possible without changing the fundamental approach of invention: perform a suitable form of control-flow analysis for each assignment of relevant symbols, e.g., using Control-Flow Graphs (CFGs), which decides if the assignment's effect may reach any statement of relevance where the symbol is used. If not, the assignment can be ignored.

Case 2: Use Address—Create Pointer
Symbol Type: Variable or Parameter, and
Reference type: Use Address
Example: ptr=& var;

In this example, the symbol under analysis is var and the symbol reference at hand is where the address of var is obtained and assigned to ptr. When obtaining the memory address of a symbol known relevant (in C using the "&" operator), any variable which possibly may carry that value (i.e., a pointer) is relevant. We refer to this as "pointer forwarding". The pointers are aliases of the original symbol. However, a case of pointer forwarding may occur without leading to an assignment of the symbol pointed to. A possible optimization is therefore to add a condition which ignores such cases of pointer forwarding.

Case 3—Function Returns
Symbol Type: Function, and
Reference Type: Return
Example: int addOne(int a){return a+1;}

When the symbol at hand is a function, the main focus is the function's return value. This is set by the return statements of the function. All return statements of a relevant function are considered relevant, as return statements give abrupt jumps in the control-flow and may prevent other statements of relevance from being executed. All primary symbol used in all return statement of the function are of relevance and should be analyzed in a recursive call to Search.

Case 4: Function Parameters
Symbol Type: Parameter, and Reference Type: Declare

A parameter is assigned by an argument expression provided in calls of the function. When analyzing a symbol of parameter type, it is necessary to follow the dataflow upstream, by recursive calls of Search on relevant argument expressions. Not all calls are however relevant for a particular query. It depends why the function became relevant. If the function is only relevant with respect to its return value and has no effect on global variables of relevance, the function is said to be locally relevant. In that case, only calls of the function where the function return value is used in a relevant context are included in the analysis of arguments. Otherwise, if the function is not locally relevant (e.g., it assigns a relevant global variable, or includes a call of a function which does this), it is globally relevant and all calls are in therefore included in the analysis of arguments. There are however two exceptions: if the queried symbol is defined in the function of the parameter, the function is globally relevant, meaning that all calls are relevant. This is also the case if the queried symbol is the function return value.

Case 5: Pointer Forwarding in Function Calls
Symbol Type: Function, and Reference Type: Call When the symbol in focus is a function, the goal is to find what affects the return value. The call-references of functions are therefore not normally relevant—the backwards dataflow is handled by Case 3 and 4. However, if the function returns a pointer to (i.e., the address of) a symbol known to be relevant (i.e., in the list of relevant symbols), this is a case of pointer forwarding and handled as described in Case 2 Similarly, if a pointer to a relevant symbol is passed as argument to a function, the corresponding parameter is a forwarded pointer (an alias) which is analyzed like in Case 2

For each reference found relevant and stored in the result list, the next step is to analyze the program code, or a representation of the program code, of the computer program on the location (statement) pointed out by the reference, and based thereon determine whether the value of the symbol depends on any other symbol or symbols. In this embodiment of the invention this step includes retrieving the lexeme linked to the reference, and searching the lexemes for other symbols which the value of the presently analyzed symbol directly depends on, block 24. This means find all symbols with direct dependencies to the analyzed symbol in the referenced statement. This step includes both finding symbols which values are used to assign the symbol in focus, and also any alias symbols defined in the statements, i.e., pointers assigned the address of a relevant symbol. If a new relevant symbol is found, a recursive call to the Search algorithm is made in order to analyze the new symbol in the same way as the initial symbol, block 28.

If the symbol to be analyzed is a parameter, the analysis includes the following steps at the definition of the parameter:
1) Find which index PI of the parameter in the function's parameter declaration list.
2) Look up the symbol entry in the database for the function (F) in which the parameter is declared,
3) For each relevant call to the function (F):
   Save the reference to the function call in the result list,
   Recursively call Search( ) for each primary symbol in the function call argument with index equal to PI the call.

Note that step 3 implies a selection of relevant function calls. This is presented in Case 4, above.

If the symbol to be analyzed is a function, all return statement of the function must be analyzed in order to find relevant symbols. The analysis includes the following steps: For each "return" reference of the function, i.e., a reference pointing to a return statement:
   Store the reference in the result list,
   Recursively call Search( ) for each primary symbol in the return statement.

The steps 12-30 (the Search algorithm) are repeated through recursion until all relevant symbols have been processed. During the analysis, block 24 is carried out for all references (statements) found relevant. The references stored in the result list are references to the locations of the program code which affects the value of the given symbol. When the Search algorithm is finished, the search module produces information on which parts of the computer program the symbol is dependent on, based on the references stored in the result list which holds the location the relevant statements. The produced information is, for example, visually presented to the user in the form of one or more graphs, e.g., where statements and/or variables are represented as graph nodes, and their direct dependencies as graph edges.

FIGS. 4-9 show an example on how analysis of the symbol named Ret can be carried out with the method according to the invention. The symbol named Ret is of the type Variable. The symbol database includes three references 32, 33, 34 for Ret. Upon receiving a request from a user to find out which statements in the program affect the value of ret, a call is made to the search algorithm disclosed in FIG. 3. Since this is the first time the algorithm is looped trough, the symbol ret is not in the data storage "analyzed symbols" and is therefore to be analyzed When the analysis of the specific symbol begins, it is stored in "Analyzed symbols", block 12. The list of references for Ret is retrieved from the database, block 16. Reference 32 is of the type Declare, reference 33 is of the type Set, reference 34 is of the type Use. From the above table 1 it is determined that the references 32 and 33 are relevant and reference 34 is not relevant, block 19. Reference 34 is however the location of the user query. Thus, reference 32 and 33 are stored in the result list, block 22, and reference 34 is discarded, block 20.

The reference 32 points at lexeme 36a in the statement at line 17 in file f1.c. The reference 33 points at lexeme 37a in the statement on line 20 in file f1.c. The representations 36, 37 of the statements including the lexemes 36a and 37a are retrieved and their respective lexemes are searched for symbols that affect the value of Ret, block 24. From the search of the representation 37 it is found that the value of Ret depends on the symbols named a and b, FIG. 5. The Search algorithm, steps 12-30, are repeated for the symbols a and b. Symbols a and b are both of the parameter type. The symbol a has two references 40 and 41, FIG. 6, but only the declare reference 40 is relevant. Thus, reference 40 is stored in the result list, block 22. The reference 40 points at lexeme 42a. The representation 42 of the statements including the lexeme 42a is retrieved and the lexemes are searched for symbols that affect the value of a, block 24. Since a is a parameter of the function add, relevant symbols are found in the arguments used in calls of this function.

The symbol add has only one call references, nr 46. The reference 46 is stored in the result list. The reference 46 points at lexeme 48a. The lexemes following lexeme 48a are searched to identify primary symbols used in the first argument of the call, corresponding to the parameter index of a, block 24. From the search it is found that the value of a depends on a symbol named p.

Figure 8:
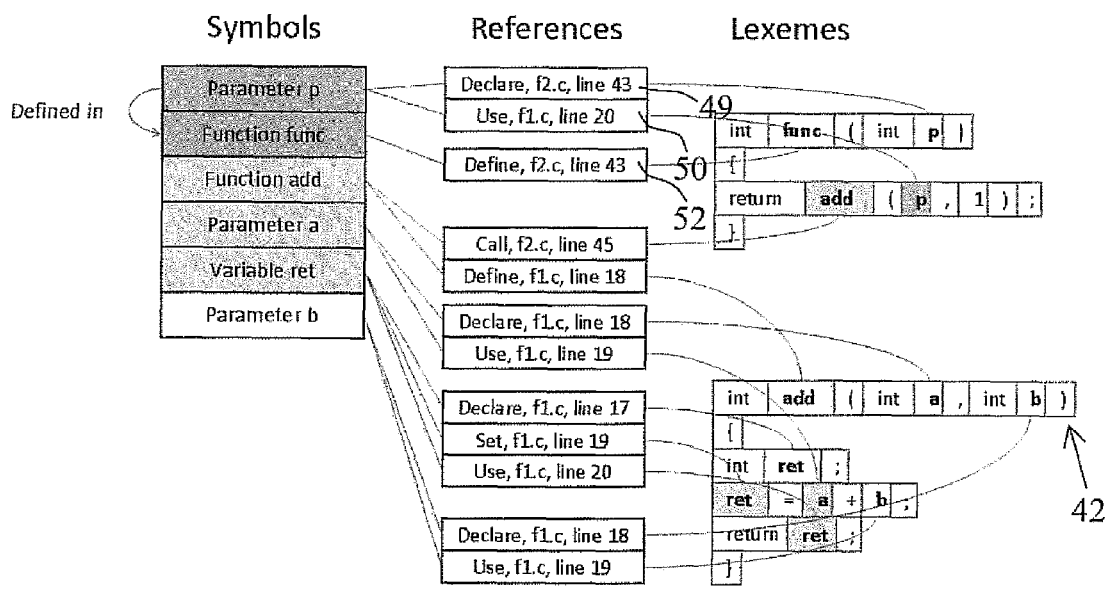

The search algorithm is repeated for the symbol p, FIG. 8. The symbol p is a parameter, but no calls of the containing function func is found. The analysis of func is thereby terminated.

Figure 9:
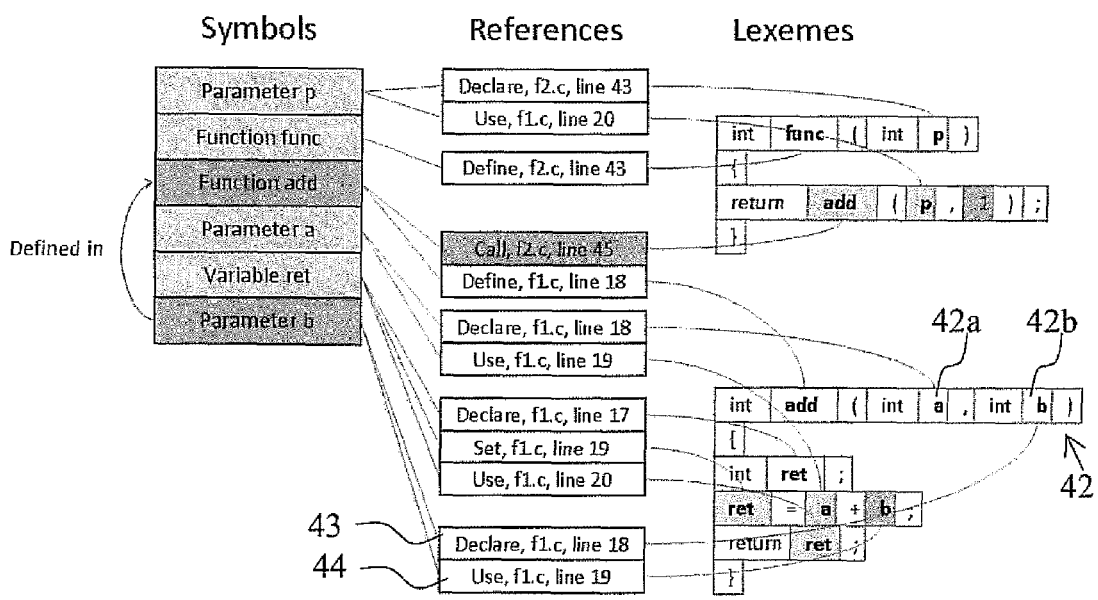

The symbol b has two references 43 and 44, FIG. 9, but only the declare reference 43 is relevant. Thus, reference 43 is stored in the result list, block 22. The reference 43 points at lexeme 42c. It is found that b is a parameter of function add and b is analyzed in the same way as a. Since b is the second argument of add, the corresponding argument in the single call of add, is a literal constant, 0. No new symbol is thereby found and the analysis of b ends without adding new relevant symbols.

In the above example, the programming language used is C. The method has been developed for ANSI C but is not sensitive to minor differences between different dialects of C, since the semantics of the code is not analyzed in full. Moreover, the method according to the present invention can conceptually be used for other imperative programming languages, like Basic, Fortran and Pascal. Object-oriented languages like C++ and Java would require extensions of the symbol database and of the search method, in order to handle things like classes, inheritance and polymorphism, but this could be implemented without changing the fundamental approach, i.e., using a symbol database followed by on-demand lexeme-level analysis.

A method carried out by a computer for producing information on dependences within a computer program including program code, the method comprising:
a) creating a symbol database including information on names of symbols, such as variables and functions, used in the computer program, and including, in connection to each symbol, a reference list including references to positions in the computer program where the symbol is used,
b) receiving a request from a user for information on dependences for a symbol, and in response to the request
c) retrieving the list of references for the symbol from said database,
d) storing the retrieved list of references in a result list,
e) analyzing for each reference on the list the program code on the positions pointed out by the reference, and based thereon determining whether the value of the symbol depends on any other symbol or symbols,
f) if the analysis discovers that the value of the symbol depends any other symbol or symbols the steps c-e are repeated in a recursive manner for the discovered symbol or symbols until the analysis reveals that the value of the symbol does not depend on any further symbol, and
g) producing information on which parts of the computer program the symbol is dependent on based on the references stored in the result list.

The present invention is not limited to the embodiments disclosed but may be varied and modified within the scope of the following claims. For example, it is most likely possible to use a different structure for the symbol database, or to apply the approach on an intermediary program representation (object code) rather than source code.

The invention claimed is:

1. A method for searching for parts of a computer program that affects a given symbol, comprising:
a) generating a symbol database (1) including information on names of symbols, such as variables and functions, used in the computer program, and including, in connection to each symbol, a reference list including references (32,34;40,41; 43,44;46,47;49,50) to locations in the computer program where the symbol is used,
b) receiving a request for information on which parts of a computer program affect a given symbol, and in response to the request,
c) retrieving the list of references for the symbol from said database, and storing at least some of the references in a result list (2), retrieving information on the type of the symbol and the type of reference, and determining whether or not the reference is relevant based on the type of symbol and type of reference, and discarding the reference if not relevant and storing the reference in the result list if relevant,
d) analyzing the program code or a representation of the program code on the locations pointed out by the stored references, and based thereon determining whether the value of the symbol depends on any other symbol or symbols,
e) if the analysis discovers that the value of the symbol depends on any other symbol or symbols the steps c-d are repeated in a recursive manner for the discovered symbol or symbols until the analysis reveals that the value of the symbol does not depend on any further symbol, and
f) producing information on which parts of the computer program the symbol is dependent on based on the references stored in the result list.

2. The method according to claim 1 comprising:
storing the analyzed symbols in a table, and
checking if the symbol is in the table, and if the symbol is in the table the symbol has already been analyzed and is therefore not analyzed again.

3. The method according to claim 1, wherein the symbol database includes a tokenized representation of the program code (36,37,42,48,51), and step (d) includes analyzing, for each reference on the list, the part of the tokenized representation of the program code pointed out by the reference.

4. The method according to claim 1, wherein the symbols include variables, parameters, and function return values.

5. The method according to claim 1, wherein generating a symbol database includes identifying all symbols in the computer program and for each symbol identifying on which locations in the computer program the symbol is used and based thereon creating a list of references to the identified locations in the computer program, and storing the list of references in the symbol database.

6. The method according to claim 1, wherein generating a symbol database further includes determining the type of symbol, storing type of symbol in the symbol database, determining the type of reference based on in which context the symbol is used, and storing type of reference in the symbol database.

7. The method according to claim 5, wherein the method further includes producing a tokenized representation of the program code of the computer program including a stream of lexemes, and storing the lexemes in the symbol database.

8. The method according to claim 1, wherein the user marks a symbol at a location in the computer program and the method comprises generating said request for information based on the marked symbol.

9. The method according to claim 2, wherein the symbol database includes a tokenized representation of the program code (36,37,42,48,51), and step (d) includes analyzing, for each reference on the list, the part of the tokenized representation of the program code pointed out by the reference.

10. The method according to claim 9, wherein the symbols include variables, parameters, and function return values.

11. A computer program product executing on a processor, comprising software for performing the steps:
   a) generating a symbol database (1) including information on names of symbols, such as variables and functions, used in the computer program, and including, in connection to each symbol, a reference list including references (32,34;40,41; 43,44;46,47;49,50) to locations in the computer program where the symbol is used,
   b) receiving a request for information on which parts of a computer program affect a given symbol, and in response to the request,
   c) retrieving the list of references for the symbol from said database, and storing at least some of the references in a result list (2), retrieving information on the type of the symbol and the type of reference, and determining whether or not the reference is relevant based on the type of symbol and type of reference, and discarding the reference if not relevant and storing the reference in the result list if relevant,
   d) analyzing the program code or a representation of the program code on the locations pointed out by the stored references, and based thereon determining whether the value of the symbol depends on any other symbol or symbols,
   e) if the analysis discovers that the value of the symbol depends on any other symbol or symbols the steps c-d are repeated in a recursive manner for the discovered symbol or symbols until the analysis reveals that the value of the symbol does not depend on any further symbol, and
   f) producing information on which parts of the computer program the symbol is dependent on based on the references stored in the result list.

12. A non-transitory computer-readable medium, having a program recorded thereon, where the program is to make a computer perform the steps of:
   a) generating a symbol database (1) including information on names of symbols, such as variables and functions, used in the computer program, and including, in connection to each symbol, a reference list including references (32,34;40,41; 43,44;46,47;49,50) to locations in the computer program where the symbol is used,
   b) receiving a request for information on which parts of a computer program affect a given symbol, and in response to the request,
   c) retrieving the list of references for the symbol from said database, and storing at least some of the references in a result list (2), retrieving information on the type of the symbol and the type of reference, and determining whether or not the reference is relevant based on the type of symbol and type of reference, and discarding the reference if not relevant and storing the reference in the result list if relevant.
   d) analyzing the program code or a representation of the program code on the locations pointed out by the stored references, and based thereon determining whether the value of the symbol depends on any other symbol or symbols,
   e) if the analysis discovers that the value of the symbol depends on any other symbol or symbols the steps c-d are repeated in a recursive manner for the discovered symbol or symbols until the analysis reveals that the value of the symbol does not depend on any further symbol, and
   f) producing information on which parts of the computer program the symbol is dependent on based on the references stored in the result list.

13. A system for searching for parts of a computer program which affects a given symbol, the system comprising:
   a processor and memory;
   a first data storage area (1) for storing a symbol database including information on names of symbols, such as variables and functions, used in the computer program, and including, in connection to each symbol, a reference list including references to locations in the computer program where the symbol is used,
   a second data storage area (2) for storing a result list, and
   a search module (6) configured to in response to a request for information on which parts of the computer program affect a given symbol,
   a) retrieve the list of references (32,34;40,41; 43 44;46,47; 49,50;51) for the symbol from said database, and store at least some of the references in the result list, wherein said symbol database includes information on the types of the symbols and said list of references includes information on the types of the references, and the search module is configured to retrieve the type of the symbol from said database, and determining whether or not the reference is relevant based on the type of symbol and type of reference, to discard the reference if not relevant and to store the reference in the result list if relevant;
   b) analyze the program code or a representation of the program code on the locations pointed out by the stored references, and based thereon determine whether the value of the symbol depends on any other symbol or symbols, and if the analysis discovers that the value of the symbol depends on any other symbol or symbols the steps (a)-(b) are repeated in a recursive manner for the discovered symbol or symbols until the analysis reveals that the value of the symbol does not depend on any further symbol, and to produce information on which parts of the computer program affects the symbol based on the references stored in the result list.

14. The system according to claim 13, wherein the system further comprises a third data storage area including a table, and the search module is configured to store the analyzed symbols in said table, and to check if the symbol is in the table before analyzing the symbol, and to not analyzed the symbol again if the symbol is in the table.

15. The system according to claim 13, wherein the system comprises an interface module for receiving a request from a user for information on which parts of a computer program affect a given symbol.

* * * * *